(12) United States Patent
Song

(10) Patent No.: US 10,856,298 B2
(45) Date of Patent: Dec. 1, 2020

(54) RESOURCE INFORMATION PROVIDING DEVICE, RESOURCE INFORMATION PROVIDING METHOD, AND COMPUTER-READABLE RECORDING MEDIUM

(71) Applicant: Samsung Electronics Co., Ltd, Gyeonggi-do (KR)

(72) Inventor: Min-jin Song, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/311,350

(22) PCT Filed: Jun. 20, 2017

(86) PCT No.: PCT/KR2017/006465
§ 371 (c)(1),
(2) Date: Dec. 19, 2018

(87) PCT Pub. No.: WO2017/222276
PCT Pub. Date: Dec. 28, 2017

(65) Prior Publication Data
US 2019/0200343 A1    Jun. 27, 2019

(30) Foreign Application Priority Data
Jun. 20, 2016   (KR) .......................... 10-2016-0076519

(51) Int. Cl.
*H04W 72/04*   (2009.01)
*H04L 29/08*   (2006.01)
*G06F 9/48*    (2006.01)
*G06F 9/50*    (2006.01)
*H04W 8/06*    (2009.01)
*H04W 56/00*   (2009.01)
*H04W 88/02*   (2009.01)
*H04W 52/02*   (2009.01)
*H04L 29/06*   (2006.01)

(52) U.S. Cl.
CPC ............ *H04W 72/048* (2013.01); *G06F 9/48* (2013.01); *G06F 9/50* (2013.01); *H04L 29/08* (2013.01);
(Continued)

(58) Field of Classification Search
CPC ........... H04W 72/048; H04W 52/0209; H04W 52/02; H04W 88/023; H04W 56/003;
(Continued)

(56) References Cited

U.S. PATENT DOCUMENTS 9,203,803 B2 * 12/2015 Ilyadis ................ H04L 63/0227
9,622,172 B2 *  4/2017 Park ................. H04W 52/0209
(Continued)

FOREIGN PATENT DOCUMENTS

KR    10-2012-0070443 A    6/2012
KR    10-2014-0003324 A    1/2014
(Continued)

OTHER PUBLICATIONS

International Search Report dated Oct. 12, 2017 in connection with International Patent Application No. PCT/KR2017/006465, 2 pages.
(Continued)

*Primary Examiner* — Brian T O Connor

(57) ABSTRACT

A resource information providing apparatus is disclosed, which includes a communication interface unit for receiving, from a first user device, a first request signal including a first time interval allowed to repeatedly receive resource information of an electronic device; and a processor for controlling the communication interface unit such that resource information is repeatedly provided to the first user device at every received first time interval.

12 Claims, 14 Drawing Sheets

(52) U.S. Cl.
CPC ........... *H04W 8/06* (2013.01); *H04W 56/003* (2013.01); *H04W 88/023* (2013.01); *H04L 63/0227* (2013.01); *H04L 63/0281* (2013.01); *H04L 63/102* (2013.01); *H04W 52/0209* (2013.01); *Y02D 30/70* (2020.08)

(58) Field of Classification Search
CPC ... H04W 8/06; Y02D 70/166; Y02D 70/1262; Y02D 70/142; H04L 63/102; H04L 67/325; H04L 67/2842; H04L 67/12; H04L 29/08; H04L 63/0227; H04L 63/0281; G06F 11/30; G06F 9/50; G06F 9/48
See application file for complete search history.

(56) References Cited

U.S. PATENT DOCUMENTS

| | | | | |
|---|---|---|---|---|
| 9,648,094 | B2* | 5/2017 | Reber | G05B 15/02 |
| 2012/0155406 | A1 | 6/2012 | Kim et al. | |
| 2015/0245288 | A1* | 8/2015 | Park | H04W 52/0209 370/311 |
| 2015/0312381 | A1 | 10/2015 | Savolainen et al. | |
| 2015/0365217 | A1 | 12/2015 | Scholten et al. | |
| 2016/0050180 | A1* | 2/2016 | Ilyadis | H04L 63/0227 726/1 |
| 2016/0242134 | A1* | 8/2016 | Amini | H04W 52/0216 |

FOREIGN PATENT DOCUMENTS

| | | |
|---|---|---|
| KR | 10-1521616 B1 | 5/2015 |
| KR | 10-2015-0100097 A | 9/2015 |
| KR | 10-2016-0006915 A | 1/2016 |
| KR | 10-2016-0041109 A | 4/2016 |

OTHER PUBLICATIONS

Written Opinion of the International Searching Authority dated Oct. 12, 2017 in connection with International Patent Application No. PCT/KR2017/006465, 6 pages.

Song Min Jin, "An Interval-Tolerant Resource Monitoring Method and Analysis of Epoch in Internet of Things", May 27, 2016, 85 pages.

* cited by examiner

【Figure 1】
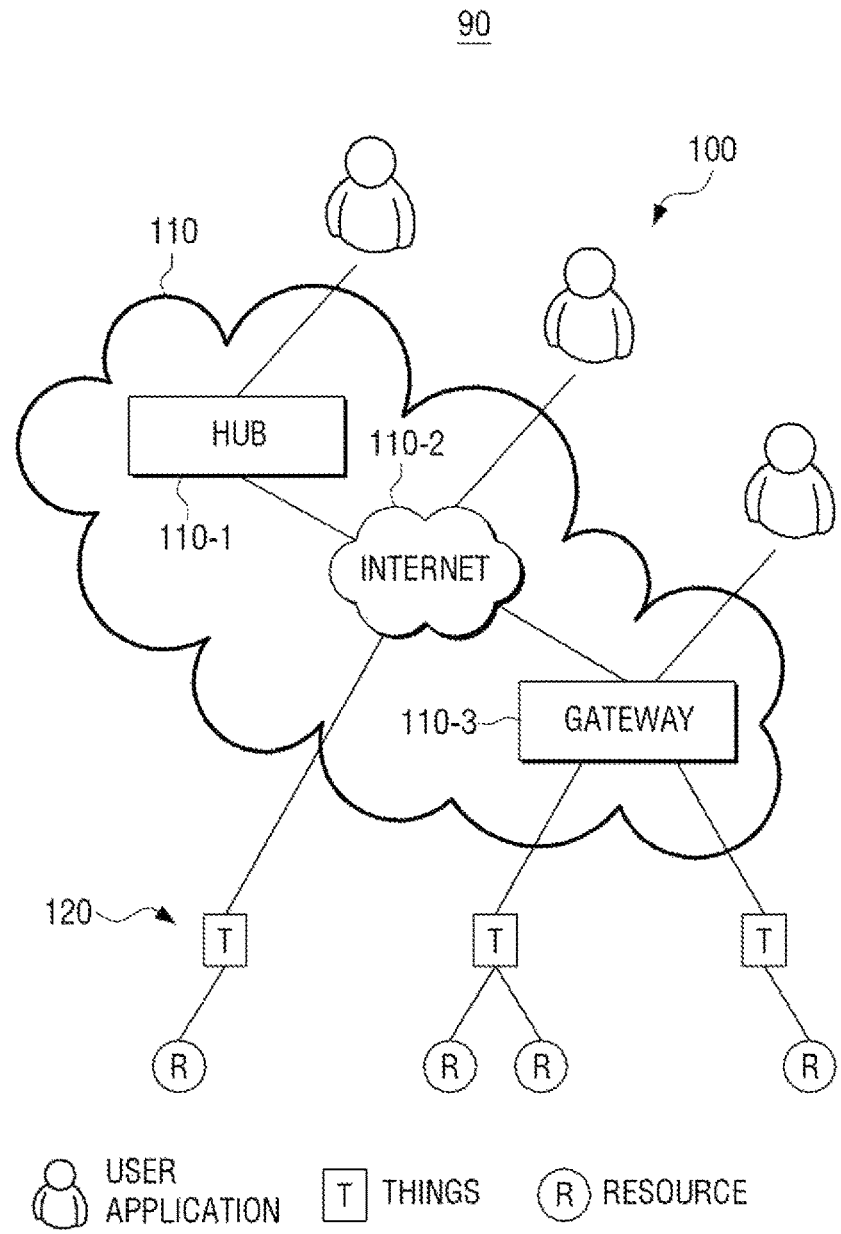
【Figure 2】
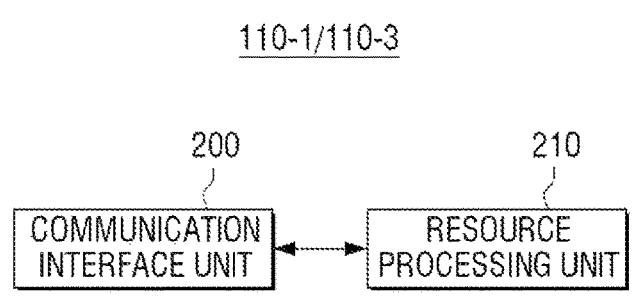

【Figure 3】
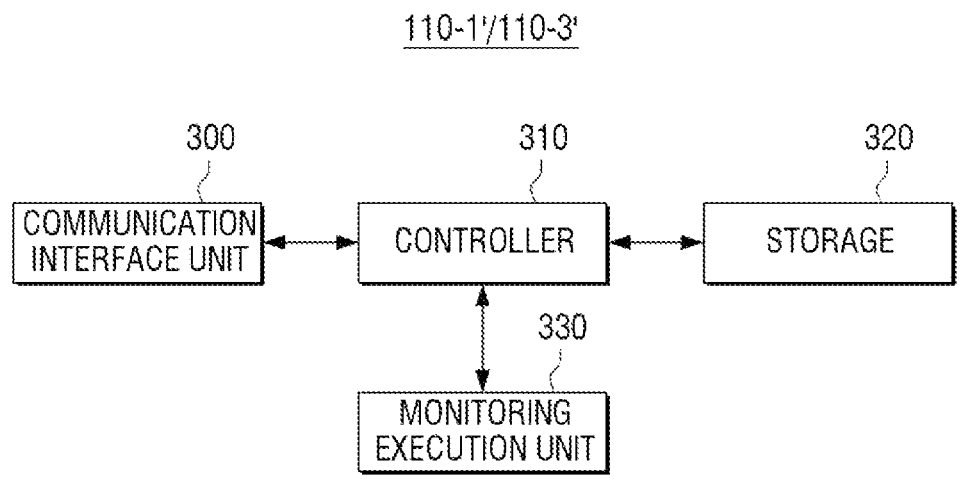
【Figure 4】
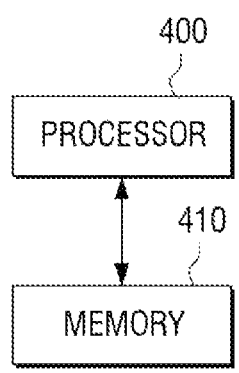

[Figure 5]
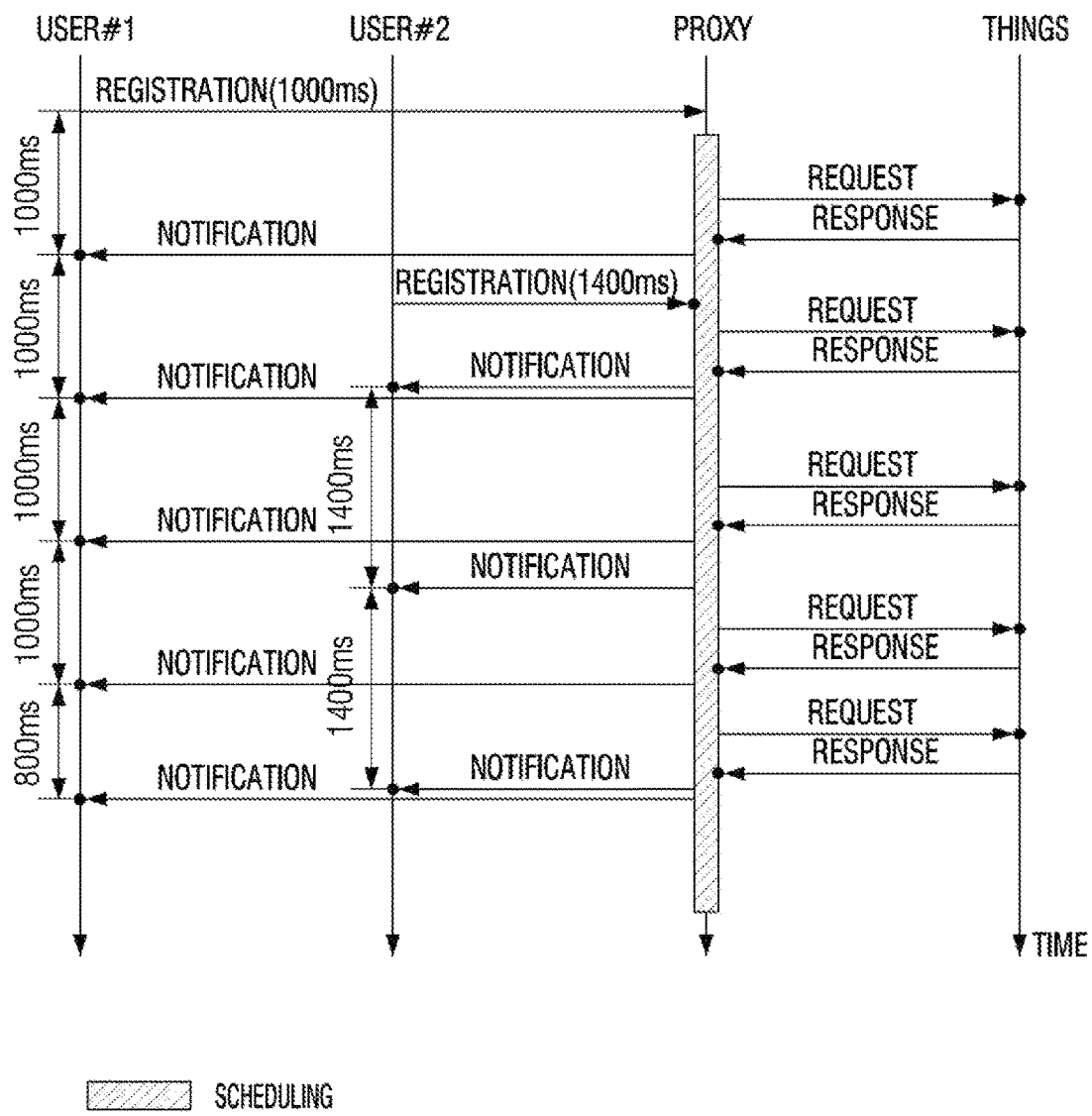

[Figure 6]
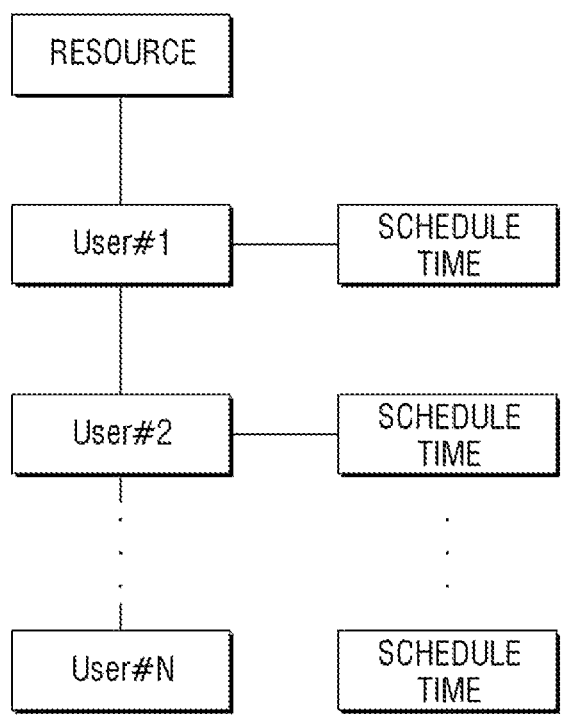

[Figure 7]
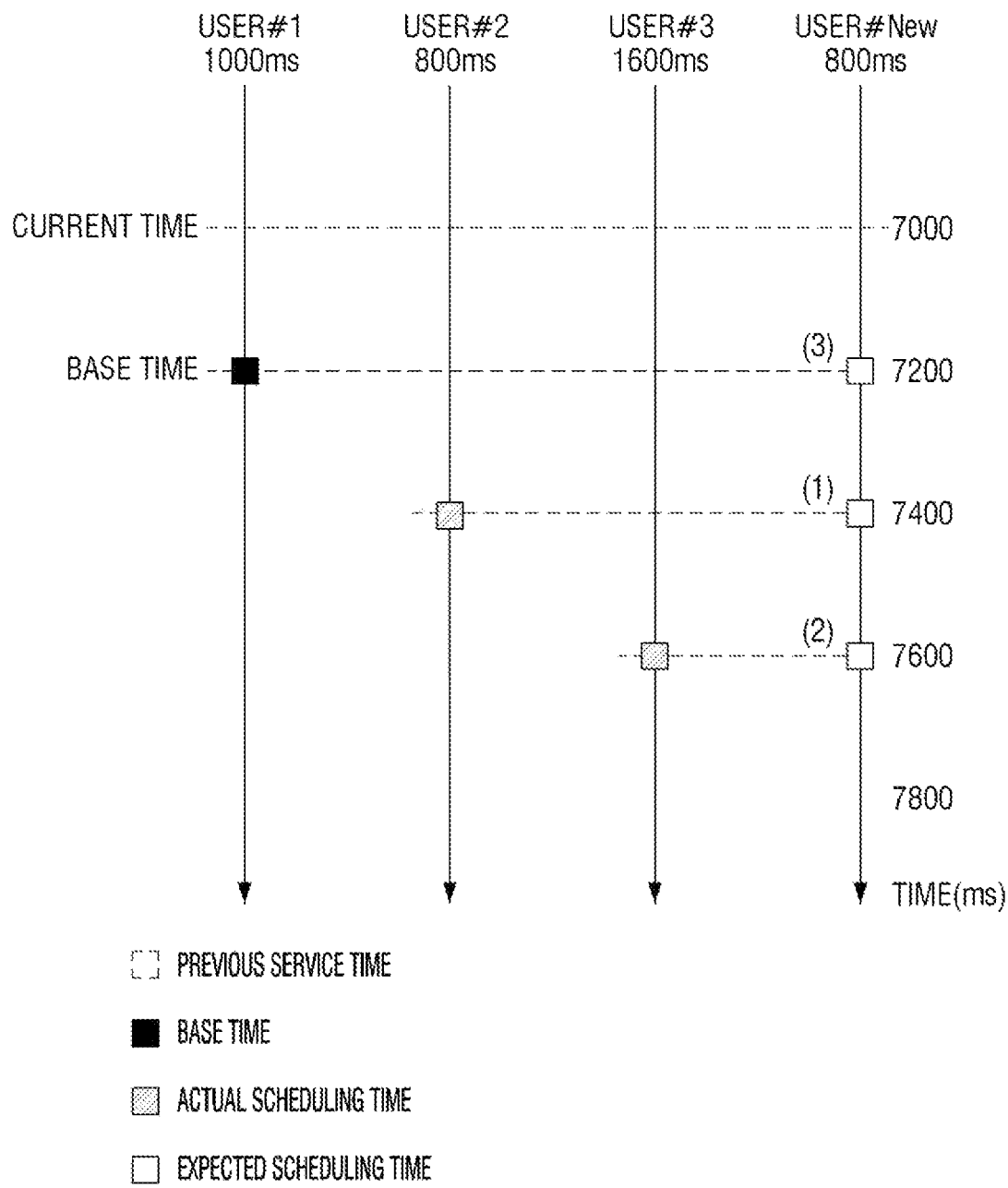

[Figure 8]
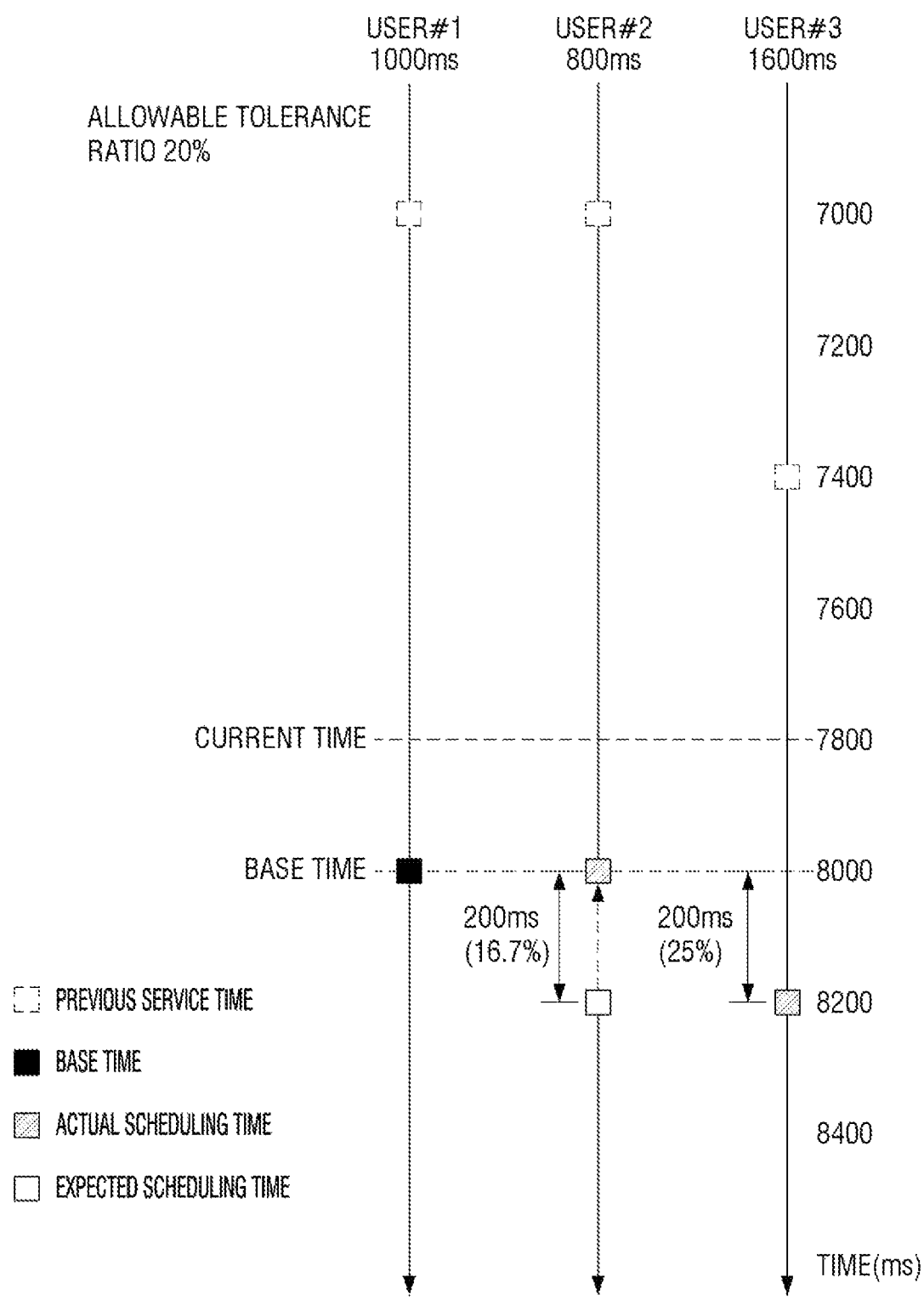

【Figure 9】
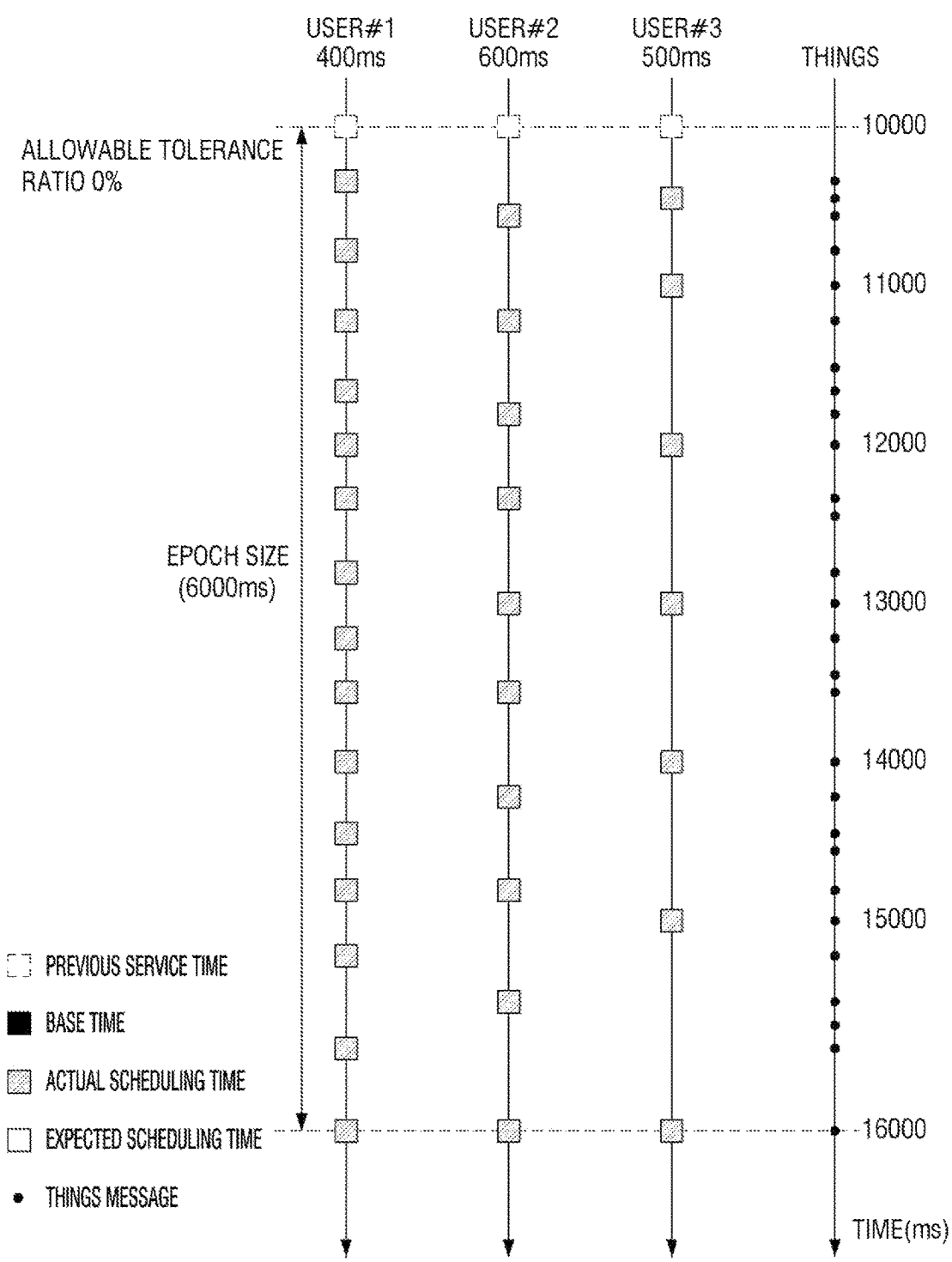

【Figure 10】
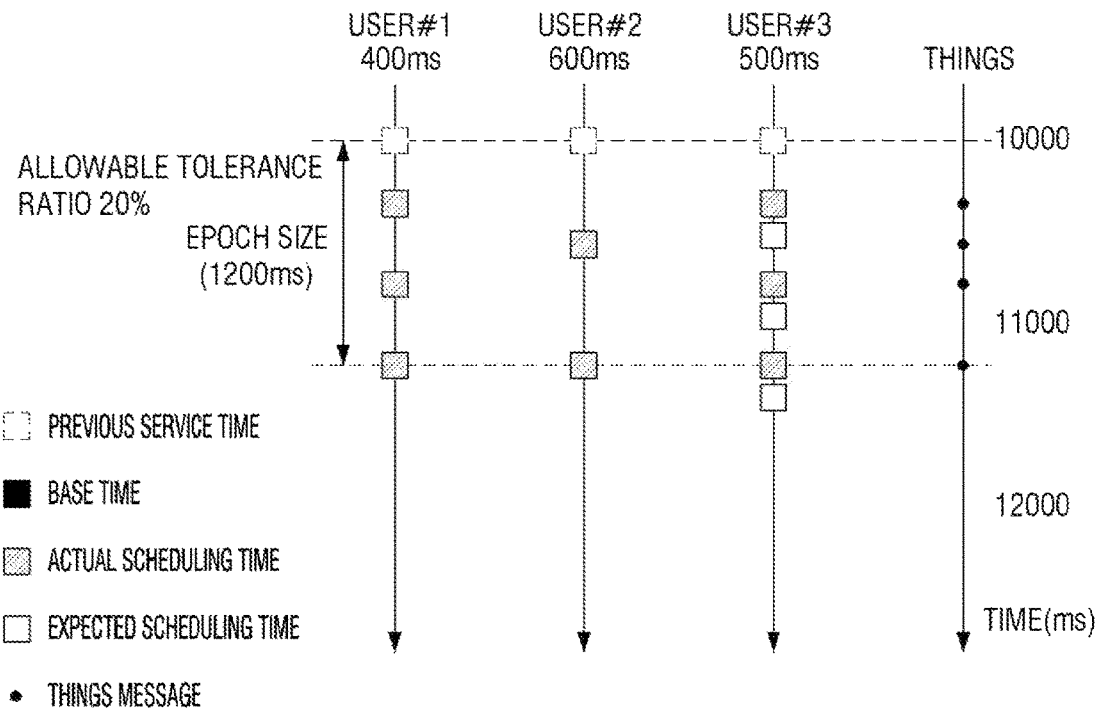
【Figure 11】
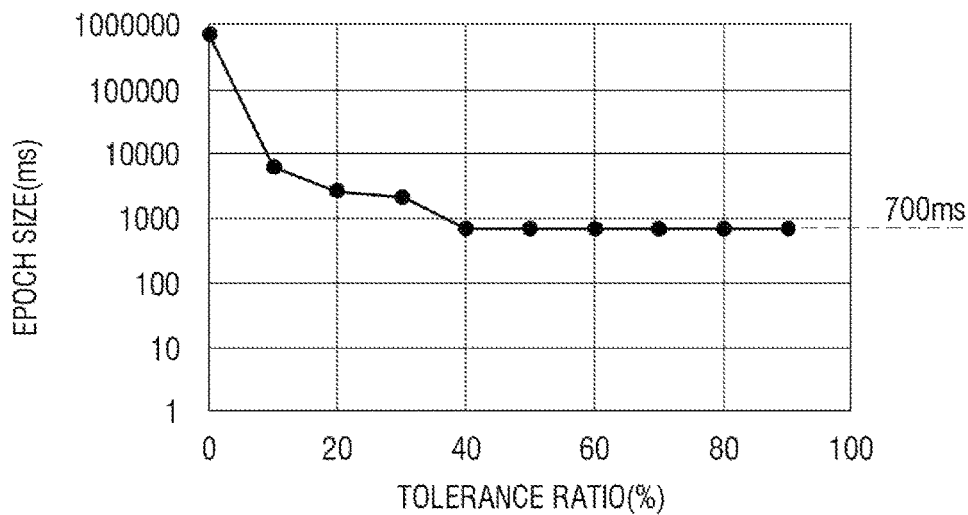
{USER$_{MAXIMUM\ INTERVAL}$} = 700ms, 900ms, 1000ms, 1100ms
LCM({USER$_{MAXIMUM\ INTERVAL}$}) = 693000

[Figure 12]
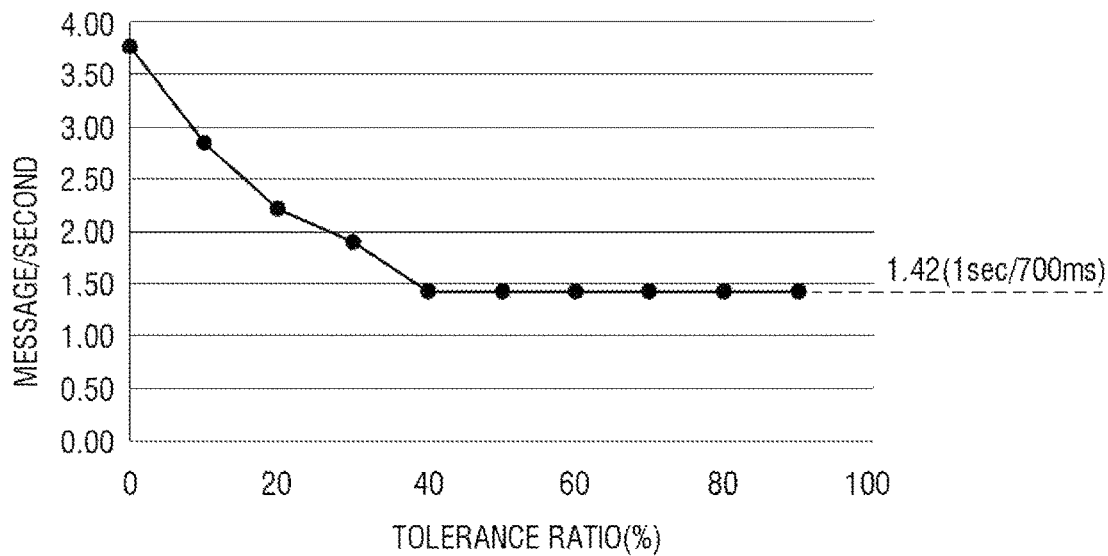
{USER$_{MAXIMUM\ INTERVAL}$} = 700ms, 900ms, 1000ms, 1100ms
LCM({USER$_{MAXIMUM\ INTERVAL}$}) = 693000
[Figure 13]
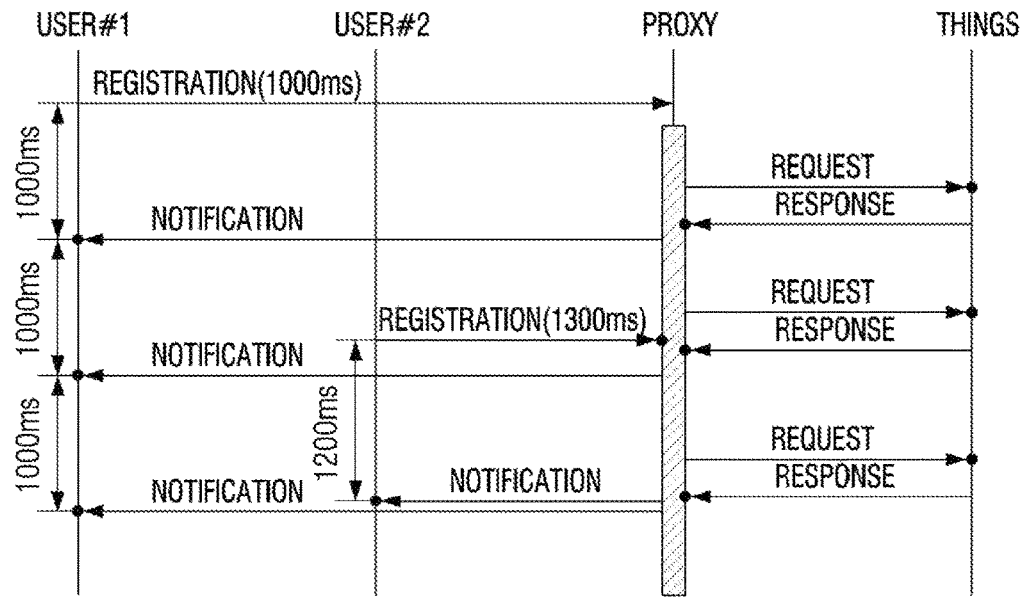

[Figure 14]
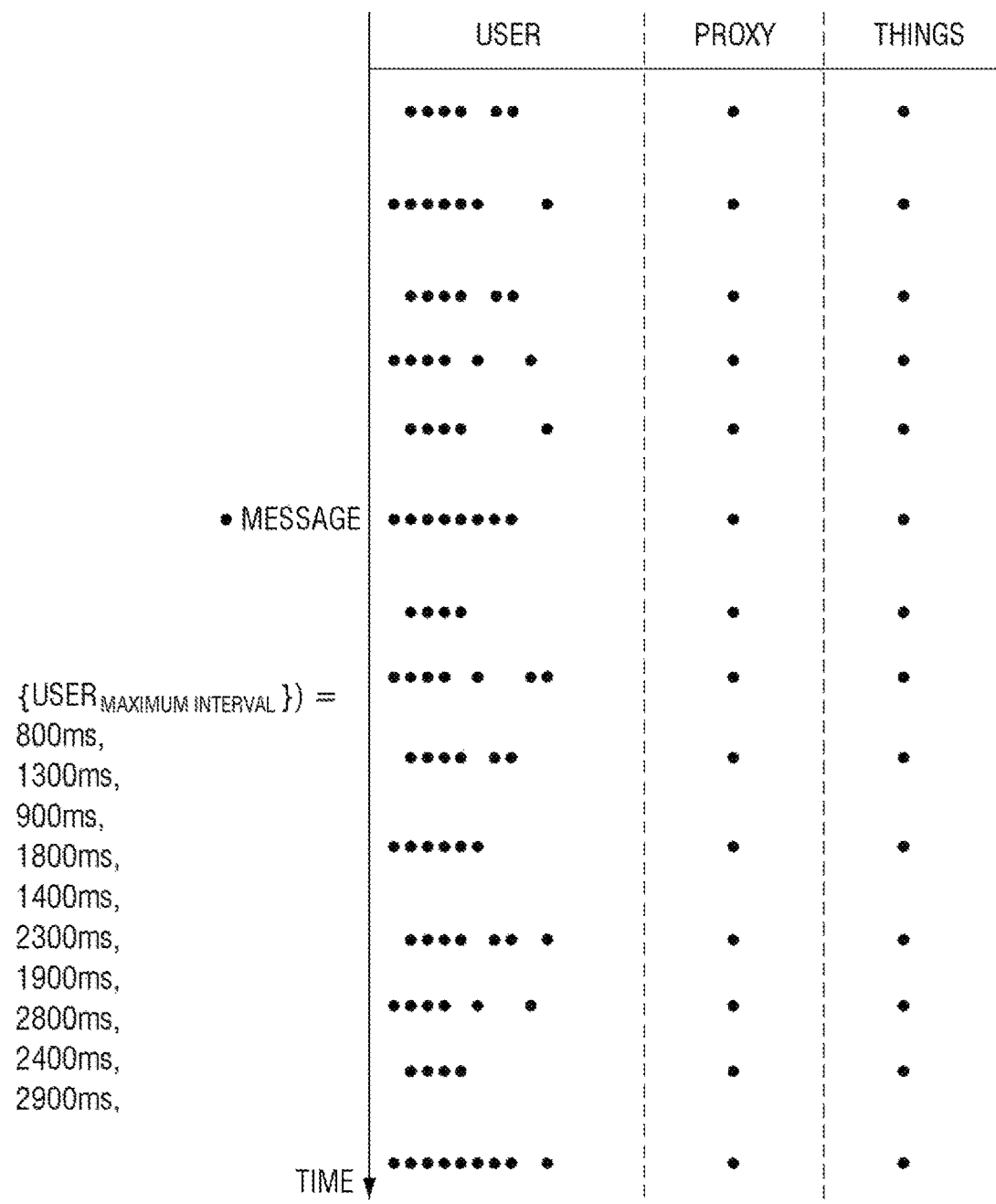

[Figure 15]
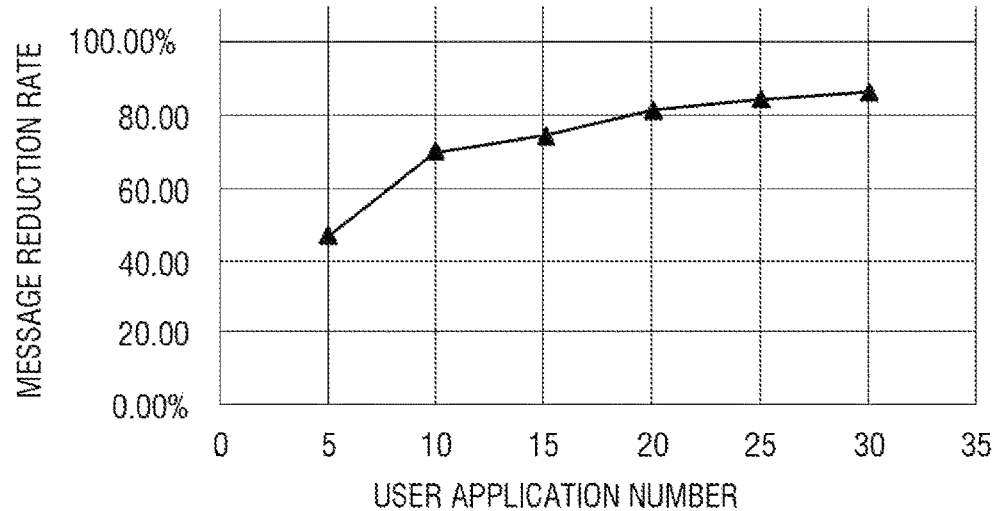
[Figure 16]
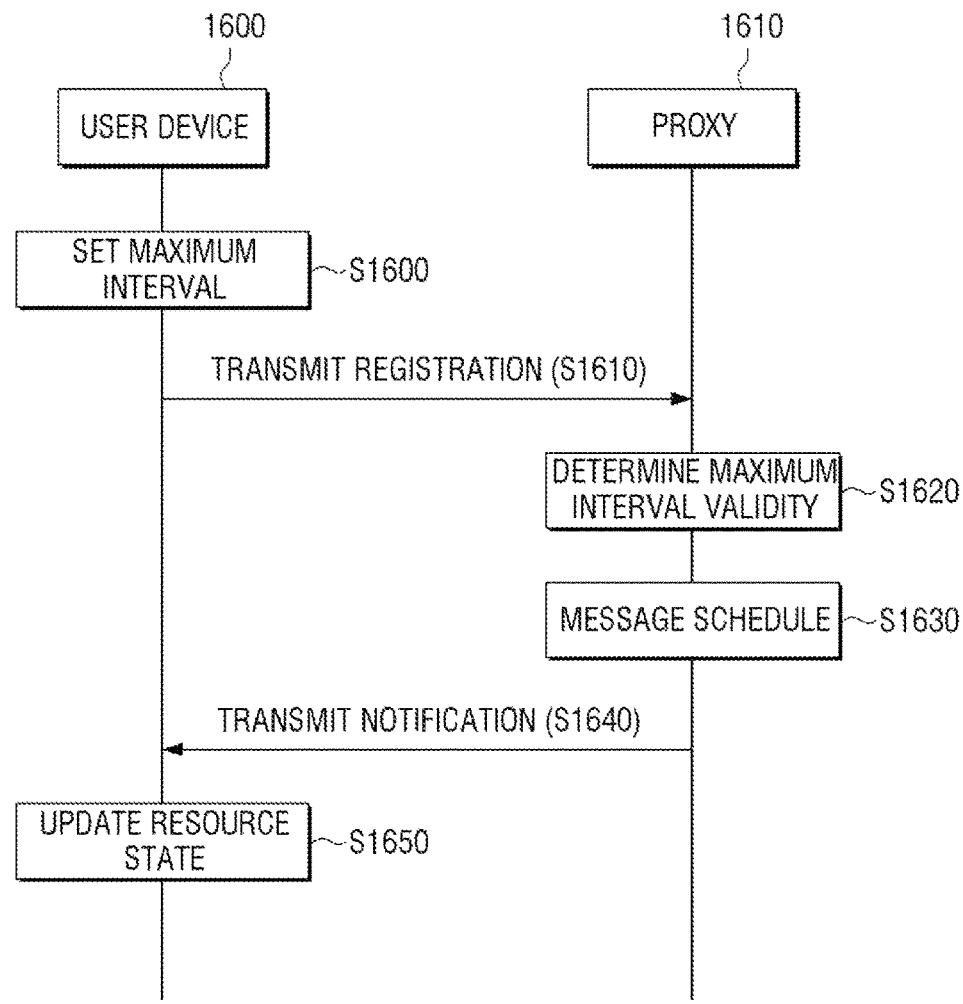

[Figure 17]
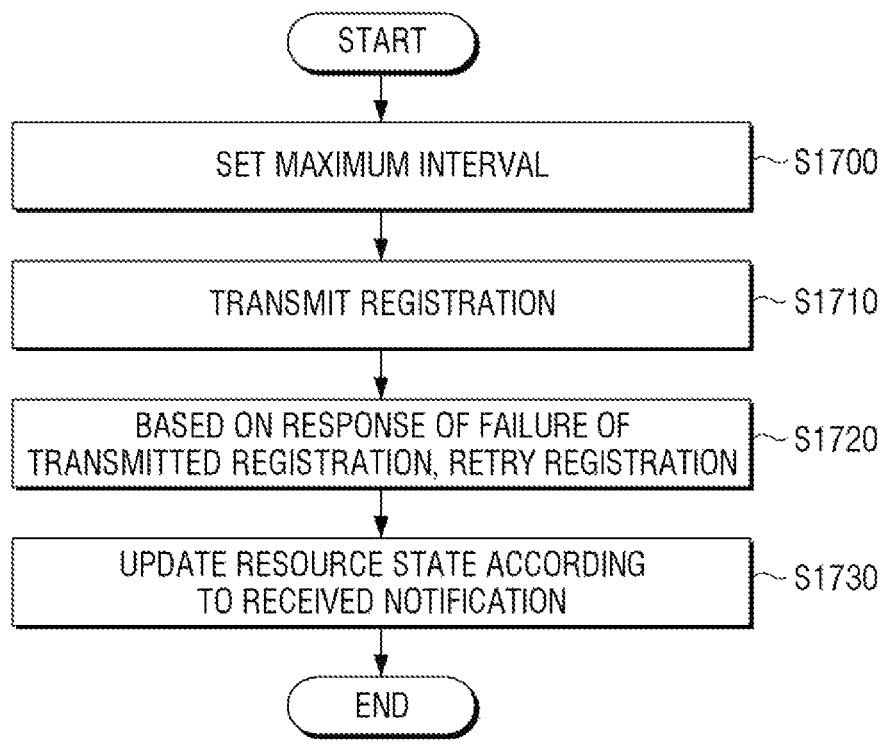

[Figure 18]
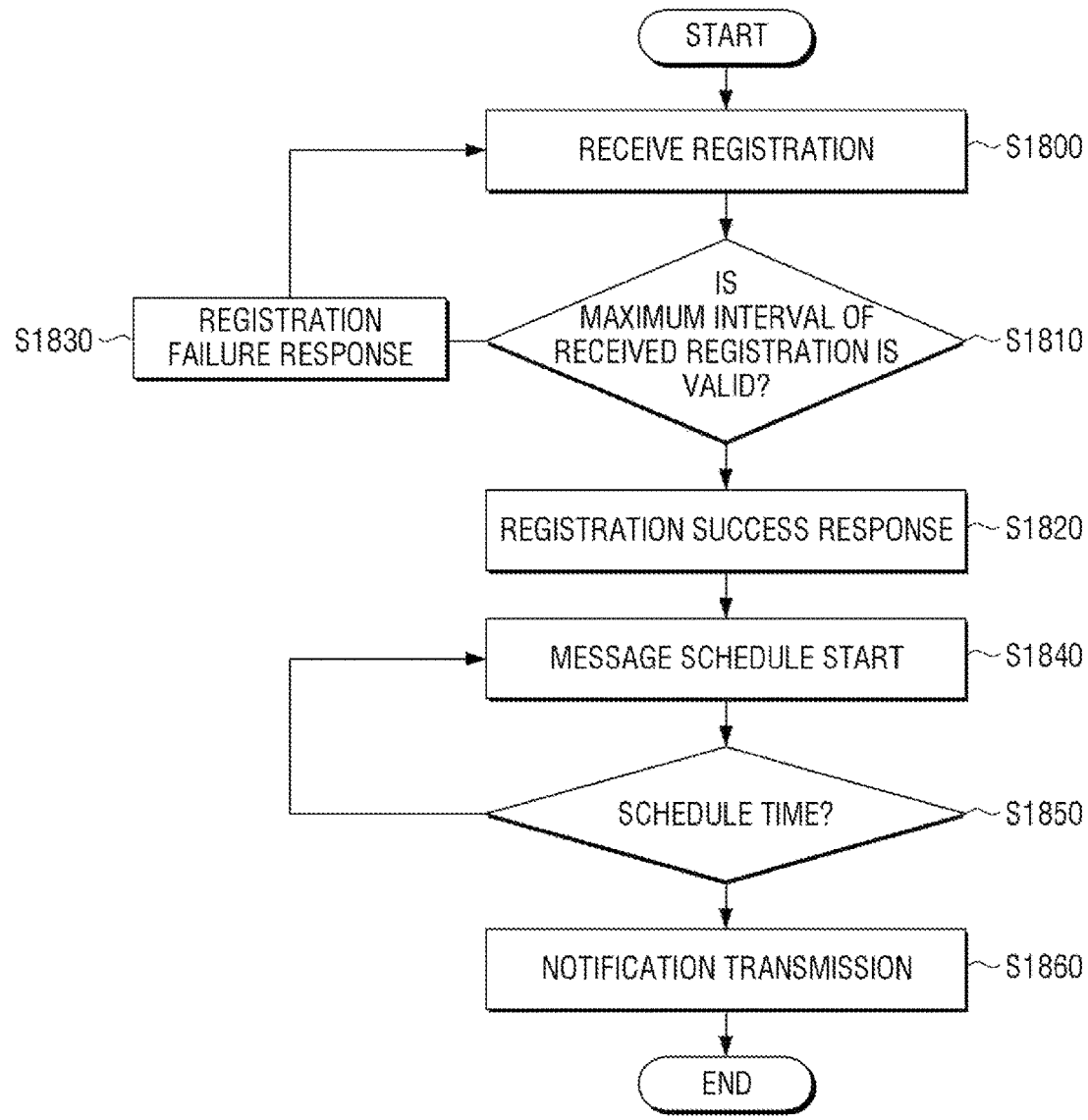

[Figure 19]
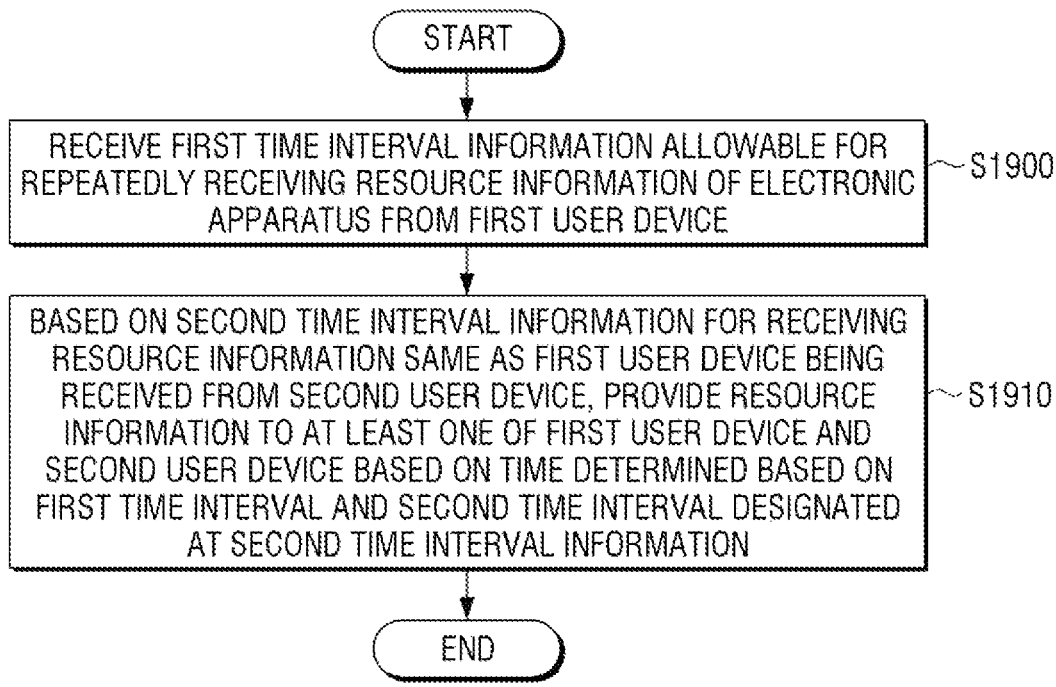
[Figure 20]
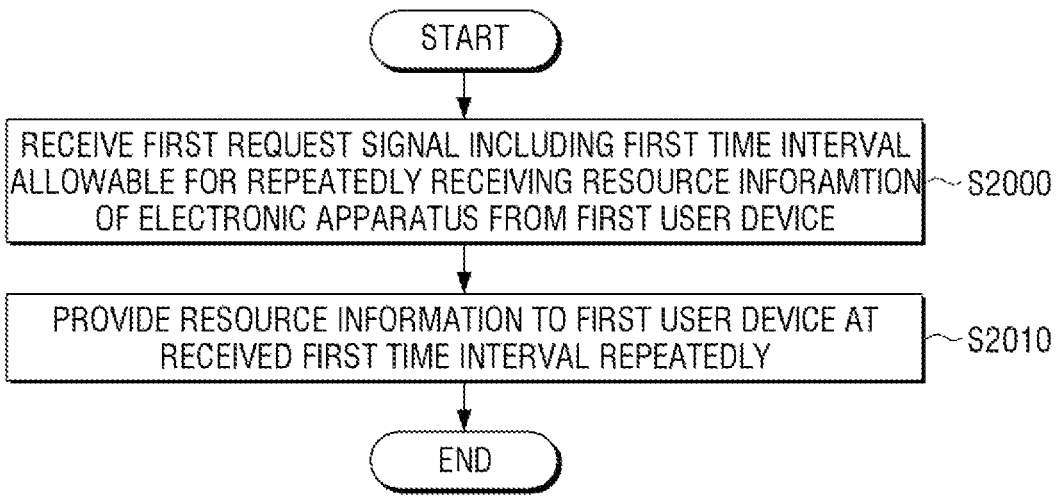

RESOURCE INFORMATION PROVIDING DEVICE, RESOURCE INFORMATION PROVIDING METHOD, AND COMPUTER-READABLE RECORDING MEDIUM

CROSS-REFERENCE TO RELATED APPLICATIONS

This application is a 371 of International Application No. PCT/KR2017/006465 filed on Jun. 20, 2017, which claims priority to Korean Patent Application No. 10-2016-0076519 filed on Jun. 20, 2016, the disclosures of which are herein incorporated by reference in their entirety.

BACKGROUND

1. Field

Devices and methods consistent with what is disclosed herein relate to a resource information providing apparatus, a resource information providing method, and a computer-readable recording medium, and more particularly, to a resource information providing apparatus for reducing message traffic of a device having a limited environment in the Internet of Things (IoT), a resource information providing method, and a computer-readable recording medium.

2. Description of the Related Art

Recently, the Internet of Things (IoT) has been widely used, and the numbers of users and things connected to the IoT service are rapidly increasing. A user service has evolved into a complex service structure in which a new service is generated by using a plurality of resource information or services from a simple structure for reading and writing resource states of things.

The functions and types of things vary, and are not limited to a single service, but provide status information (or resource information) to more than one opened form service. Such trend increases traffic of the things and consume functional resources of the things. Particularly, things having low performance results in reduced operating time due to limited battery consumption and delayed response at a lower processing speed.

In order to solve such problem, according to a conventional technique uses a structural method and a message exchange method of the things of Internet. To be specific, the structural method uses the structural characteristic of the Internet of things such as hubs, gateways, and proxies located between things and users, and the message change method uses lightweight protocols CoAP and MQTT, for example, for message change of limited things.

However, such conventional techniques have limits in reducing traffic of things in a limited environment of the Internet of things (IoT). Therefore, a large amount of power is consumed.

An embodiment of the present disclosure is purposed to provide a resource information providing apparatus for reducing message traffic of a device having a limited environment in the IoT, a resource information providing method, and a computer readable recording medium.

SUMMARY

According to an exemplary embodiment, there is provided a resource information providing method, the method including receiving a first request signal including a first time interval allowed for repeatedly receiving resource information of an electronic apparatus from a first user device, and providing the resource information to the first user device repeatedly at the received first time interval.

The method may further include receiving a second request signal including a second time interval allowed for repeatedly receiving the resource information, and providing the resource information to at least one of the first user device and the second user device at a time determined based on the first time interval and the second time interval.

The first time interval and the second time interval may be set to a default of an application included in the first user device and the second user device, or set by a user on a UI screen displayed on a screen.

The providing of the resource information may include determining whether the resource information is transmittable to the second user device at the first time interval by changing the second time interval, as a result of determination, based on the resource information being transmittable, transmitting the resource information to the second user device.

The determining may include determining whether the first time interval and the second time interval coincide with each other or are in a least common multiple relationship or a greatest common factor relationship, or based on a current time (a base time) of the first time interval to arrive, whether a tolerance ratio of the second time interval is within a predetermined allowable range.

The tolerance ratio of the second time interval may be determined based on equation.

$$USER_{ToleranceRatio} = \frac{(USER_{ScheduleTime} - \text{Base Time})}{USER_{Max-Interval}} \times 100$$

(where $USER_{ScheduleTime}$ is obtained by combining a previous schedule time when a message is transmitted with the second time interval)

According to an exemplary embodiment, there is provided a resource information providing apparatus including a communication interface unit configured to receive a first request signal including a first time interval allowed for repeatedly receiving resource information of an electronic apparatus from a first user device, and a processor configured to control the communication interface unit to repeatedly provide the resource information to the first user device at the received first time interval.

The communication interface unit may be further configured to receive a second request signal including a second time interval allowed for repeatedly receiving the resource information, and wherein the processor is further configured to control the communication interface unit to provide the resource information to at least one of the first user device and the second user device at a time determined based on the first time interval and the second time interval.

The first time interval and the second time interval may be set to a default of an application included in the first user device and the second user device, or set by a user on a UI screen displayed on a screen.

The resource information providing apparatus may be a relay apparatus positioned on a communication path between the electronic apparatus and at least one of the first user device and the second user device, and include a server, a proxy device connected to the server, a gateway, or a hub.

The processor may be further configured to determine whether the resource information is transmittable to the second user device at the first time interval by changing the second time interval, and as a result of determination, based on the resource information being transmittable, control the communication interface unit to transmit the resource information to the second user device.

The processor may be further configured to determine whether the first time interval and the second time interval coincide with each other or are in a least common multiple relationship or a greatest common factor relationship, or based on a current time (a base time) of the first time interval to arrive, whether a tolerance ratio of the second time interval is within a predetermined allowable range.

The processor may be further configured to determine a tolerance ratio of the second time interval based on equation.

$$USER_{ToleranceRatio} = \frac{(USER_{ScheduleTime} - \text{Base Time})}{USER_{Max-Interval}} \times 100$$

(where the $USER_{ScheduleTime}$ is obtained by combining a pervious schedule time when a message is transmitted with the second time interval)

According to an exemplary embodiment, there is provided a computer readable recording medium that stores a program for executing a resource information providing method, wherein the resource information providing method includes receiving a first request signal including a first time interval allowed for repeatedly receiving resource information of an electronic apparatus from a first user device, and providing the resource information to the first user device at the received first time interval repeatedly.

BRIEF DESCRIPTION OF THE DRAWINGS

FIG. 1 is a view illustrating an Internet of things system according to an embodiment of the present disclosure;

FIG. 2 is a view illustrating an example of a detailed structure of a resource information providing apparatus shown in FIG. 1;

FIG. 3 is a view illustrating an example of a detailed another structure of the resource information providing apparatus shown in FIG. 1;

FIG. 4 is a view illustrating an example of a detailed structure of a controller of FIG. 3;

FIGS. 5 to 8 are views to explain a interval-tolerant resource monitoring method according to an embodiment of the present disclosure;

FIGS. 9 to 12 are views to explain epoch analysis according to an embodiment of the present disclosure;

FIGS. 13 to 15 are views to explain an experiment result according to an embodiment of the present disclosure;

FIG. 16 is a view illustrating a resource information process according to an embodiment of the present disclosure;

FIG. 17 is a flowchart showing a driving process of a user device according to an embodiment of the present disclosure;

FIG. 18 is a flowchart showing a driving process of a proxy according to a first embodiment of the present disclosure;

FIG. 19 is a flowchart showing a driving process of a proxy according to a second embodiment of the present disclosure; and FIG. 20 is a flowchart showing a driving process of a proxy according to a third embodiment of the present disclosure.

DETAILED DESCRIPTION

Hereinafter, embodiments of the present disclosure will be described in detail with reference to the drawings.

FIG. 1 is a view illustrating an Internet of things system according to an embodiment of the present disclosure.

Referring to FIG. 1, an Internet of things system 90 according to an embodiment of the present disclosure may include a user device 100, a communication network 110, and an electronic apparatus 120 (hereinafter, referred to as '<thing>'), and the communication network 110 may include a resource information providing apparatus (hereinafter, referred to as 'proxy').

The user device 100 may include an application according to an embodiment of the present disclosure. The application may be a program for providing the Internet of things to a user through an interface. The application may be downloaded from a server of an operator of the application in a firmware format through the communication network 110, but may be pre-stored at the time of releasing the user device 100. Such application may be used for requesting resource information (or state information) of the thing 120 through a hub 110-1 or a gateway 110-2, which is connected to the Internet. The application may only use the Internet of thing service, but also generate the service. Examples of the resource information of the thing 120 may be state information indicating a washing state or a remaining time for a washing machine at home, and in the case of a vinyl house, sensing information indicating temperature, humidity, or the like.

The application of the user device 100 may be provided by the third party. Such application may provide time interval information on the maximum time interval for which time interval the user wishes to receive the resource information at each time when the user requests for the resource information to the thing 120. Accordingly, the user device 100 may receive the resource information of the thing 120 within the maximum time. The maximum time information may be determined by a purpose (or usage) of the user application provided by the third party. For example, resource information on a sensor in a vinyl house may be requested more quickly than the case of a TV at home. Therefore, the third party that provides an application related to the sensor, etc. may shorten the maximum time interval and provide the application to the user. In the case of a thermometer of the vinyl house, the application may set the maximum time interval for monitoring to 500 ms, but set the maximum time interval for opening and closing a cover of the vinyl house to 10 minutes (10×60×1000 ms). The allowable maximum time interval could be set to a default of an application, but also set by an interface between the application and the user through a UI screen displayed on a screen. Therefore, the setting of the allowable maximum time interval is not limited thereto.

The communication network 110 may include both wired and wireless communication networks. The wired network may include an Internet network 110-2 such as a cable network or a public switched telephone network (PSTN), and the wireless communication network may include CDMA, WCDMA, GSM, Evolved Packet Core (EPC), Long Term Evolution (LTE), a WiBro network, and the like. The communication network 110 according to the embodiment of the present disclosure is not limited thereto, but can be used as an access network of a next-generation mobile communication system to be implemented in future, for example, in a cloud computing network under a cloud computing environment. For example, when the communication network 110 is a wired communication network, an access point in the communication network 110 may access a switching center of a telephone office or the like, but in the case of a wireless communication network, the access point may process data by accessing an SGSN or a Gateway GPRS Support Node (GGSN), or by connecting to various repeaters such as a Base Station Transmission (BTS), a NodeB, an e-NodeB, etc.

The communication network 110 may include an access point. The access point may include a small base station such as a femto or pico base station, which is installed in a building in great number. The femto or pico base station may be defined according to the maximum number of things 120 that can be accessed in term of small base station. The access point may include a near field communication module for performing near field communication between the thing 120 and ZigBee, Wi-Fi, etc. The access point may use TCP/IP or Real-Time Streaming Protocol (RTSP) for wireless communication. The near field communication may be performed by various standards such as Radio Frequency (RF) and Ultra-Wide Band (UWB) communication such as Bluetooth, Zigbee, IrDA, Ultra High Frequency (UHF), and Very High Frequency (VHF). Accordingly, the access point may extract the location of the data packet, specify the best communication path to the extracted location, and forward the data packet to a subsequent device, e.g., the thing 120, along the designated communication path. According to an embodiment, it may be understood that the communication is a path for registering the maximum time interval information by transmitting a message, and receiving resource information thereof. The access point may share a plurality of lines in a general network environment, and may include, for example, a router, a repeater, etc.

According to an embodiment of the present disclosure, the hub 110-1 may be one of the access points, and provided as a connection medium for an application to access the Internet of things service. The Internet of things service may be provided through the hub 110-1, and a user may be provided with the Internet of things service without restriction of location and time. The gateway 110-2 may be a connection device for allowing the thing 120 to access the Internet without restriction of network.

Generally, the gateway 110-2 may exist in a local area where the thing 120 is physically located. The gateway 110-2 may connect the thing 120 to the Internet regardless of communication environment such as Wi-Fi, ZigBee, Bluetooth, Z-Wave, and the like.

At least one of the hub 110-1 and the gateway 110-2 may include proxy. The proxy may be a logical device for replacing the thing 120 to overcome the performance limitation of the thing 120. According to the present disclosure, the proxy may be referred to as a resource information providing apparatus, but the proxy may be an additional device in a stand-alone form aside from the hub 110-1 or the gateway 110-2 while being linked to the hub 110-1 or the gateway 110-2, or included in the hub 110-1 or the gateway 110-2. According to an embodiment, the hub 110-1 or the gateway 110-2 including the proxy may be a resource information providing apparatus. Therefore, the form of the resource information providing apparatus is not limited. The representative function to overcome the performance limitations may be resource cache. The resource cash may temporarily store resource information, and may provide a quick response to the resource information request of the thing 120 satisfying temporal locality without transmitting a message to the thing 120. According to the present disclosure, the resource information providing apparatus may not include the cache, but is not limited thereto.

The thing 120 may be an electronic apparatus which provides resource information in the Internet of things, and provide resources and perform network communication. The thing 120 may include all types of things from a device capable of only simple operation to a high-performance device. The thing 120 having limitations may cause inefficiency in the Internet of things service due to the low performance. The performance of the thing 120 may be limited in terms of power, network and processing speed. The thing 120 with limited power may rapidly consume the power of the thing 120, and the use time may be reduced when traffic increases. In addition, the thing 120 with the limited network and processing speed may experience a delay in response time due to traffic delays as traffic increases. Therefore, according to an embodiment, for example, by reducing the messages of the thing 120 having limited performance, it is possible to increase a battery use time, and prevent response delay caused by a bottleneck phenomenon.

FIG. 2 is a view illustrating a detailed structure of the resource information providing apparatus shown in FIG. 1.

Referring to FIG. 2, resource information providing apparatuses 110-1 and 110-3 may include a communication interface unit 200 and a resource processing unit 210.

The communication interface unit 200 may transmit the information provided from the user device 100 of FIG. 1 to the resource processing unit 210, receive the resource information corresponding to the transmitted information from the resource processing unit 210 and transmit the information to the user device 100. Further, during the above process, encryption and decryption may be performed.

The resource processing unit 210 may provide resource state information to the user within a time required by the user, and include three critical functions of max-interval (or maximum time interval), schedule time shift, and allowable time tolerance ratio (or an allowable interval tolerance ratio). The "maximum interval" may be a maximum time for the user to repeatedly receive resource information of the thing 120. The "schedule time shift" may refer to putting the planned service time ahead. The "allowable tolerance ratio" may be a ratio between the maximum interval and the changed time when the schedule time is changed. The proxy may schedule message service time for all users by using the maximum interval and perform schedule time shift within the allowable tolerance ratio. The detailed description of the resource processing unit 210 will be made below.

FIG. 3 is a view illustrating a detailed another structure of the resource information providing apparatus shown in FIG. 1, and FIG. 4 is a view illustrating a detailed structure of a controller of FIG. 3.

Referring to FIG. 3, resource information providing apparatuses 110-1' and 110-3' according to another embodiment of the present disclosure may include part or all of a communication interface unit 300, a controller 310, a storage 320, and a monitoring execution unit 330.

The expression "including part or all" means that some constituent elements such as the storage 320 is omitted, or some constituent elements such as the monitoring execution unit 330 is integrated into another constituent element such as the controller 310. However, in this description, it is assumed that the resource information providing apparatuses 110-1' and 110-3' include all of a communication interface unit 300, a controller 310, a storage 320, and a monitoring execution unit 330 to fully explain the present disclosure.

Compared to the resource information providing apparatuses 110-1 and 110-3 of FIG. 2, the resource information providing apparatuses 110-1' and 110-3' of FIG. 3 may be different in that the resource processing unit 210 of FIG. 2 is split into the controller 310 and the monitoring execution unit 330 in terms of hardware. In other words, the resource processing unit 210 of FIG. 2 may simultaneously perform the control function and the various monitoring operations according to an embodiment of the present disclosure, and the controller 310 of the resource information providing apparatuses 110-1' and 110-3' of the FIG. 3 may perform the overall control function of the device, and the monitoring execution unit 330 may perform only the monitoring operation of the device.

For example, the monitoring execution unit 330 may change the schedule time and check the allowable interval tolerance ratio while providing resource information obtained from the thing 120 at a predetermined time interval based on information on the maximum interval provided by a user. The monitoring execution unit 330 may have an EEPROM format to allow free writing and deleting of a program.

Apart from the above, the resource information providing apparatuses 110-1' and 110-3' of FIG. 3 are not significantly different from the resource information providing apparatuses 110-1 and 110-3 of FIG. 2. Therefore, the description will not be repeated.

The controller 310 of FIG. 3 may include a processor 400 and a memory as shown in FIG. 4. According to the above-described configuration, the processor 400 may load a program stored in the monitoring execution unit 330 during an initial operation with the resource information providing apparatuses 110-1 and 110-3 to a memory 410, store the program, and execute the program stored in the memory 410 to perform a monitoring operation. As a result, compared the configuration shown in FIG. 3, a data processing speed may increase. In other words, the controller 310 of FIG. 3 may control the motoring execution unit 330 to execute a program and receive the result accordingly. Therefore, a data processing speed of FIG. 3 may be relatively lower than that of the configuration of FIG. 4.

The storage 320 may temporarily store various information processed by the resource information providing apparatuses 110-1' and 110-3', and may output the result upon the request of the controller 310.

Hereinafter, a resource monitoring method, traffic analysis using epoch, experiment environment, and the result thereof will be described. The "epoch" may refer to a period of the repeated schedule time. As the allowable interval tolerance ratio increases, the size of epoch may be reduced, and the number of messages per hours may be also reduced.

FIGS. 5 to 8 are views to explain a monitoring method of interval-tolerant resource according to an embodiment of the present disclosure.

For ease of explanation, referring to FIG. 1, the Internet of things service may be provided by using the resource state information of the thing 120. The resource state information may be provided by renewing a user application interface, or by inputting another new service. The Internet of things service may require information on monitoring and history of resource state during a predetermined period rather than the resource state of a one-time thing at a specific point of time.

When the resource state information of the thing 120 is provided to a user application at a short time interval, the user application may not only renew the resource state more accurately with high real time, but also quickly deal with the problem. However, if the user application receives the resource state information of the thing 120 more frequently than necessary by using a conventional application protocol of the Internet of things, the resource state information provided to the user application may be abandoned, and the message traffic of the thing 120 may increase. The message traffic increase to the limited thing 120 may result in not only decrease of the use time of the thing 120, but also increase of the response time of the limited thing 120.

For such reason, the resource state information may be received from the thing 120 within a specific time to update the resource state as required by the user application or the user service. The user application may provide the time interval information, that is, the maximum interval, to the proxy as much as needed, and the proxy may periodically provide the resource state of the thing 120 to the user application at a time changed in a time reversed direction within the maximum interval information provided from each user application and the allowable range. A method for providing the resource state information of the thing 120 within an allowable range at a changed time is referred to as an interval-tolerant monitoring method.

According to the interval-tolerant resource monitoring method, examples of a message transmitted between the user application, the proxy, and the thing 120 may be a registration message, a notification message, and an unregister message.

The registration message may be a message that a user application transmits to the proxy to periodically monitor the resource state information of the thing 120. When receiving the registration message, the proxy may generate and add a new user application node and a schedule time node to the notification message schedule linked list. The registration message may be requested once before receiving the resource state information of the thing 120, and include information a resource identifier of the thing 120 to be monitored, the maximum interval, which is the maximum time interval to receive the resource state information, and the user.

The maximum interval may be the maximum time interval of the notification message that the proxy transmits the resource state information of the thing 120 to be monitored by the user application to the user application. If a new notification message is not received until when the maximum interval time passes from a time when a previous notification message is received, the user application may determine that a problem occurs between the user application and the thing, and perform recovery, retry, or termination.

The notification message may be a message including the resource state information of the thing 120 that the proxy transmits to the user application. The proxy may transmit a notification message to the user application within the maximum interval time requested by each user application. The proxy may repeatedly transmit the notification message to the user application before receiving an unregister message.

The unregister message may be a message which transmits a message not to receive the resource state information of the thing 120 if the user application no longer wishes to receive the resource state information of the thing 120. The unregister message may include information on the thing 120 to be terminated, the resources, and the user. When receiving the unregister message, the proxy may remove a user application node and a schedule time node from the notification message schedule linked list, and may not transmit the notification message to the user application.

According to an interval-tolerant resource monitoring method, a registration message, a notification message, and unregister message may be sequentially executed. The registration message may be transmitted once at the start, and the unregister message may be transmitted once at the end from the user application to the proxy, but the notification message may be transmitted from the proxy to the user application at the maximum interval from the a time when the registration message is transmitted to the proxy, to a time when the unregister message is transmitted to the proxy.

FIG. 5 is a view illustrating an interval-tolerant resource monitoring method, and referring to USER #1 of FIG. 5, a registration message (the maximum interval of 1000 ms) may be transmitted to the proxy, and after receiving the registration message, the proxy may read the resource state information of the thing at a time interval of 1000 ms and transmit the notification message to the user application. Referring to USER #2, a registration message (the maximum interval of 1400 ms) may be transmitted to the proxy, and after receiving the registration message, the proxy may read the resource state information of the thing at the time interval of 1300 ms, and transmit a notification message to the user application. The proxy may determine an actual schedule time to be transmitted to each user application by using the maximum interval information and the allowable interval tolerance ratio of each user application. The actual schedule time may be obtained by performing time shift from the estimated (or expected) schedule time. Referring to USER #1 of FIG. 5, the 5$^{th}$ message may be transmitted after the maximum interval of 800 ms, not 1000 ns, from a previous notification transmission time.

Upon receiving a request for the resource state information of the thing through a registration message, the proxy may calculate a time for transmitting a notification message to each user application. A point of time when the notification message is provided to the user application is referred to as an actual schedule time, and the actual schedule time may be obtained by using the base time, the expected schedule time, and the previous service time.

The notification message positioned before now in the notification message schedule linked list in the schedule time node may be the actual schedule time. When the actual schedule time is positioned before now, the actual schedule time may be set to the previous service time and the newly planned schedule time may be calculated.

The calculation process (e.g., algorithm) may be expressed by <table 1> below.

TABLE 1

1: if Now ≥ USER$_{ActualScheduleTime}$ then
2:     USER$_{PerviousServiceTime}$ = USER$_{ActualScheduleTime}$
3:     USER$_{ActualScheduleTime}$ = 0
4:     USER$_{ExpectedScheduleTime}$ = USER$_{PerviousServiceTime}$ + USER$_{Maxinterval}$
5: end if The most following actual schedule time after now in the schedule time node of the notification message schedule linked list is referred to as a base time. The base time may be used for a purpose value when all user applications perform time shift from the expected schedule time. The base time may be expressed by equation 1 below.

$$\text{BaseTIme} = \text{MIN}(\{\text{USER}_{ActualScheduleTime}\}) \quad \text{Equation 1 [mathematical formula 1]}$$

When now is greater than the actual schedule time in the schedule time node of the notification message schedule linked list, a new schedule time may be calculated, but an expected schedule time may be obtained by adding the maximum interval to the previous service time. The expected schedule time may be used as a visual value for obtaining the actual schedule time later on. The expected schedule time may be expressed by equation 2 below.

$$\text{USER}_{ExpectedScheduleTime} = \text{USER}_{PerviousScheduleTime} + \text{USER}_{MaxInterval} \quad \text{Equation 2 [mathematical formula 2]}$$

The actual schedule time AST may be a time when the actual notification message is transmitted in the schedule time node of the notification message schedule linked list. The actual schedule time may be set to a base time of now during the time shift, and the expected schedule time may be the actual schedule time when time shift is not performed.

Such process is expressed by table 2 below.

TABLE 2

1: if (USER$_{ActualScheduleTime}$ ==0)and(USER$_{ScheduleTimeShift}$ ==1) then
2:     USER$_{ActualScheduleTime}$ = BaseTIme
3: else
4:     USER$_{ActualScheduleTime}$ = USER$_{ExpectedScheduleTime}$
5: end if The tolerance ratio (or time shift rate) is expressed as a percentage 0 to 100% of the time from the expected schedule time to the base time in the schedule time node of the notification message schedule linked list divided by the maximum interval. The tolerance ratio may be expressed by equation 3 below.

Equation 3

$$\text{USER}_{ToleranceRatio} = \frac{(\text{USER}_{ScheduleTime} - \text{Base Time})}{\text{USER}_{Max-Interval}} \times 100 \quad \text{[mathematical formula 3]}$$

The allowable tolerance ratio may refer to a reference value for determining time shift execution, and perform time shift when a tolerance ratio at a present time of each user application is within an allowable tolerance ratio. The allowable tolerance ratio may be collectively set in the proxy according to the characteristic of the thing 120, and used as a reference value for time shift of all user applications. However, in the case of the user application subject to the tolerance of the interval, a customer allowable tolerance ratio used only in the user application may be used upon an additional request. Such process is expressed by table 3 below.

TABLE 3

1: if (USER$_{ToleranceRatio}$ ≤ USER$_{AllowedToleranceRatio}$) then
2:     USER$_{ScheduleTimeShift}$ = 1
3: else
4:     USER$_{ScheduleTimeShift}$ = 0
5: end if The proxy may include a notification message schedule linked list, which is a structure for managing transmission time of notification messages to be provided to a user application.

FIG. 6 is a view illustrating an example of a notification message schedule linked list, and referring to FIG. 6, the notification message schedule linked list may include resource nodes including information for identifying resource of things. Based on the above, nodes may be generated including names of all user applications requested for registration to the resource, information to be used for communication, and maximum interval information, and connected to resource nodes. When more than 1 user applications are present, a new user application node may be further linked to the existing user application node. Each user application node may include a schedule time node including time information that provides the notification to the user application. When the current schedule time is the same as or earlier than the actual schedule time, the notification message may be transmitted to the user application.

FIG. 7 is a view to explain a process for determining a first schedule time. When a new user application is added to a notification message schedule linked list, an initial time value for transmitting an initial notification message to the user application needs to be set, but the traffic of the thing may be reduced considering the schedule time of the existing user application.

When USER #New is newly added, a value of an initial schedule time may be determined in the following order.
(1) When USER #A having the same maximum interval as USER #New is present, the expected schedule time of USER #New may be set to an actual schedule time value.
(2) When USER #A having the maximum interval that is twice the maximum interval of USER #New is present, the expected schedule time of USER #New may be set to an actual schedule time value.
(3) The expected schedule time of USER #New may be set to a base time value.

Referring to FIG. 7, when the base time is 7200 ms and the maximum intervals of USER #1, USER #2 and USER #3 are respectively 1000 ms, 800 ms, and 1600 ms, and if USER #New having the maximum interval of 800 ms is added, the expected schedule time of USER #New may be set to the actual schedule time of USER #2 having the same maximum interval. If USER #2 is not present, the expected schedule time of USER #New may be set to the expected schedule time of USER #3 having the maximum interval of 1600 ms, which is twice the maximum interval of USER #2. If USER #3 is not present, the expected schedule time of USER #New may be set to a base time.

FIG. 8 is a view to explain schedule time shift according to an embodiment of the present disclosure. The proxy may monitor the notification transmission time of the schedule time node in the notification message schedule linked list at a time slice interval, and renew the schedule time node with the newest information corresponding to the current time. The time shift may be generated in a time reversed direction to maintain the maximum interval only when the tolerance ratio of the user application is within the allowable tolerance ratio.

Referring to FIG. 8, the current time may be 7800 ms, and the base time may be 8000 ms, which is the expected schedule time of all the user applications in the nearest future from the present. The expected schedule time of USER #2 may be 8200 ms, but the tolerance ratio may be 16.7%, which is equal to or less than the allowable tolerance ratio of 20%. Therefore, time shift may be performed and the actual schedule time may be 8000 ms. The expected schedule time of USER #3 may be 8200 ms, which is the same as that of USER #, but the tolerance ratio may be 25%, which exceeds the allowable tolerance ratio of 20%. Therefore, the actual schedule time may be the same as the expected schedule time.

FIGS. 9 to 12 are views to explain epoch analysis according to an embodiment of the present disclosure.

The interval-tolerant resource monitoring method may be a method for reducing the traffic of things through the schedule time shift within an allowable range, and analysis of the traffic and the distribution characteristic of things over a predetermined time may be needed. According to an embodiment of the present disclosure, a temporal space for such analysis may be referred to as epoch. The epoch may separate the temporal space for traffic analysis and scheduling during the run-time of the system, that is, the execution time, and prevent time delay due to the system loading caused by calculation.

In terms of epoch, when each of the user applications determines the transmission time of the notification message by using its own maximum interval, the actual schedule times of all the user applications may be repeated as a collection of the same actual schedule times after a predetermined time. The dictionary definition of the epoch is a period divided in time, and according to an embodiment of the present disclosure, a temporal space from a point of time when the collection of the actual schedule times starts repeating a point of time when the collection of the actual schedule time terminates repeating. The size of the epoch refers to the length of the epoch time. According to the traffic analysis and the distribution analysis in the interval-tolerant resource monitoring method, a point of time when the actual schedule times of the all user applications are the same may be used as the start of the epoch, and a point of time when the same schedule time of all the first user applications after the start of the epoch may be used as the end of the epoch. The actual schedule time at the epoch start time may be set to a previous service time and may not be included in the analysis.

FIG. 9 shows an epoch of the interval-tolerant resource monitoring method when the allowable tolerance ratio is 0%. USER #1, USER #2, and USER #3 of FIG. 9 may respectively receive notification messages at intervals of 400 ms, 600 ms, and 500 ms, which are the maximum intervals of respective user applications. The proxy may transmit the notification messages 15 times to USER #1, 10 times to USER #2 and 12 times to USER #3, and in this case, the thing may transmit messages 27 times to the proxy.

The start of an epoch may be 10,000 ms, the end of an epoch is 16,000 ms, and the epoch size may be 6,000 ms. Since the time shift does not occur with the allowable tolerance ratio at 0%, the epoch size may be equal to the least common multiple of the maximum intervals of the user application, which is 6000 ms. The epoch size may be expressed by equation 4 below.

$$\text{Epoch Size}_{TR(0\%)} = \text{LCM}\{(\text{USER}_{MaxInterval})\} \quad \text{Equation 4 [mathematical formula 4]}$$

The least common multiple of the maximum intervals of all the user applications may rapidly increase as the number of user applications increases with the allowable tolerance ratio at 0%. As a result, the length of the epoch may be also increased. In this case, when load occurs to the scheduling calculation and analysis of the notification message during the run-time of the system, message transmission may be unexpectedly delayed.

Since the interval-tolerant resource monitoring method obtains the actual schedule time through the time shift of the expected schedule time, the change of the epoch due to the dynamical time shift may occur. Such time shift may be effected by the allowable tolerance ratio.

FIG. 10 shows epoch using an interval-tolerant resource monitoring method with the allowable tolerance ratio at 20%, USER #1, USER #2, and USER #3 of FIG. 10 may respectively receive notification messages at intervals of 400 ms, 600 ms, and 500 ms, which are the maximum intervals of respective user applications. The proxy may transmit the notification messages three times to USER #1, two times to USER #2, and three times to USER #3. However, in the case of USER #3, the schedule time shaft may occurs three times. The total message in the epoch of the thing may occur four times.

The epoch may start at 10,000 ms, the epoch may terminate at 11,200 ms, and the size of the epoch may be 1200 ms. The epoch size may be reduced by 4,800 ms with the allowable tolerance ratio at 0%.

FIG. 11 shows an epoch size according to an allowable tolerance ratio. FIG. 11 shows the epoch size according to the allowable tolerance ratio under the condition that four user applications respectively have the maximum intervals of 700 ms, 900 ms, 1000 ms and 1100 ms.

If the allowable tolerance ratio is 0%, the epoch size may be 693000 ms, which is equal to the least common multiple of the maximum intervals of all user applications. However, as the allowable tolerance ratio increases, the epoch size may be reduced, converging to the smallest value among the maximum intervals of all user applications. The epoch size may be expressed by equation 5 below.

$$\text{Epoch Size} \geq \text{MIN}(\{USER_{MaxInterval}\}) \quad \text{Equation 5 [mathematical formula 5]}$$

The allowable tolerance ratio and the traffic will be described as follows.

The interval-tolerant resource monitoring method may allow the time shift within the allowable tolerance ratio and reduce the traffic of the thing. The traffic of the thing may be defined by the number of the messages per hour. How the allowable tolerance ratio affects the number of messages of things per hour will be analyzed. The MPS may be expressed by equation 6 below.

Equation 6

$$MPS(\text{Messages Per a Second}) = \frac{\text{All Thing's Messages}}{\text{seconds}} \quad \text{[mathematical formula 6]}$$

FIG. 12 shows messages per second of things according to allowable tolerance ratios under the condition that four user applications have the maximum intervals of 700 ms, 900 ms, 1000 ms, and 1100 ms, respectively.

Referring to FIG. 12, if the allowable tolerance ratio is 0%, the number of messages per second may be 3.77 (Messages/Second) and 2610 messages may be generated during 693000 ms. As the tolerance ratio increases, the traffic may decrease but converge to a value obtained by dividing 1 second by the smallest value of the maximum interval of the user application. The MPS may be expressed by equation 7 below.

Equation 7

$$MPS(\text{Messages Per a Second}) \geq \frac{1000 \text{ ms}}{\text{MIN}(\{USER_{MaxInterval}\})} \quad \text{[mathematical formula 7]}$$

The message distribution characteristic in the time domain of the message exchange method in the Internet of things will be analyzed and a message reduction effect according to the number of user applications in the interval-tolerant resource monitoring method will be described.

FIGS. 13 to 15 are views to explain an experiment result according to an embodiment of the present disclosure.

Referring to FIG. 13, the interval-tolerant resource monitoring method may involve a user application, a proxy, and a thing as shown in FIG. 13, and the proxy may perform scheduling of the transmission time of the notification message by using the maximum interval and the allowable tolerance ratio.

FIG. 14 illustrates a time of receiving resource state information with the allowable tolerance ratio at 20% under the condition that 10 user applications include max-ages of 800 ms, 1300 ms, 900 ms, 1800 ms, 1400 ms, 2300 ms, 1900 ms, and 2800 ms, and 2900 ms, respectively.

All the resource state information messages received from the user applications may be 87, and the number of messages transmitted to the proxy by the thing may be 14, and therefore 73 messages may be reduced. This is because locality of the notification occurrence time of the user application is increased by performing time shift within the allowable range.

A message reduction rate may be obtained by using the number of resource state information messages reduced in the thing compared to the number of resource state information messages received in the user application. The higher the unit, the greater the effect of message reduction. The message reduction rate may be expressed by equation 8 below.

Equation 8

$$\text{Message Reduction Rate} = \frac{\left(\begin{array}{c}\text{All USER's Messages} - \\ \text{Thing's Messages}\end{array}\right)}{\text{All USER's Messages}} \times 100 \quad \text{[mathematical formula 8]}$$

FIG. 15 illustrates a message reduction rate of the interval-tolerant resource monitoring method (an allowable tolerance ratio of 20%) when the number of user applications increases.

The message reduction rate may increase as the number of user applications increase. Considering 10 user applications, the interval-tolerant resource monitoring method may reduce the messages by approximately 70.22%. As the number of user applications increases, the increase in the message reduction rate may gradually slow down.

According to an embodiment of the present disclosure, the interval-tolerant resource monitoring method of the thing in the Internet of things environment and a traffic analysis method using the epoch have been described. The interval-tolerant resource monitoring method is purposed to increase the battery use time of the thing with limited performance, and to reduce the traffic of thing to prevent the response delay caused by the bottleneck phenomenon. Such method reduces the significant amount of traffic under the condition that 10 user applications are connected and the allowable tolerance ratio is 20%.

The proxy may perform the interval tolerance scheduling during the run-time by using the epoch analysis to distinguish temporal boundaries and reduce operations that can cause a load. As the tolerance ratio increases, the size of the epoch may be reduced, so that the load caused by the schedule calculation may be reduced, and the number of messages per hour may be reduced.

The interval-tolerant method has an advantage in embodying and applying regardless of network type and system environment, as an application protocol. The proxy may be applied to the consecutive proxies by using message schedules. When the frequency of change of the resource state of the ting is smaller than the average of the frequencies of the resource states required by a user application, the proxy may maximize the traffic reduction effect when monitoring resources.

FIG. 16 is a view illustrating a resource information process according to an embodiment of the present disclosure.

Referring to FIG. 16, a user device 1600 according to an embodiment of the present disclosure may include an application for repeatedly receiving resource information of thing in the Internet of things environment. Such application provided by the third party may include the maximum time interval information according to an embodiment of the present disclosure at step S1600. Such maximum time interval information may be set to a default at the time of application creation, but it may be also set on a UI screen displayed on the user device 1600 by a user through the interface. Therefore, the present disclosure is not limited thereto.

The use device 1600 may request for registration by transmitting the maximum time interval information at the initial stage of requesting resource information at step S1610. The device information (e.g., device ID, etc.) of the user device 1600 may be transmitted together.

The proxy 1610 may determine validity based on the received maximum time interval information at step S1620. The validity may indicate whether the registration process is normally performed. If valid, the proxy 1610 may transmit a success response (ok response) to the user device 1600, and if invalid, the user device 1600 may request for retry.

If valid, the proxy 1610 may perform a message scheduling operation at step S1630. The message scheduling operation may include, if the maximum time interval information is received at the initial stage, determining whether there is time interval information that coincides with a time interval based on the received time interval information or involves a correlation (e.g. least common multiple, greatest common factor, etc.), and coinciding the maximum time interval with the time interval.

The proxy 1610 may transmit the resource information in the form of a message to the user device 1600 through scheduling at step S1640.

The user device 1600 may renew the existing information to the received resource information at step S1650.

FIG. 17 is a flowchart illustrating a driving process of a user device according to an embodiment of the present disclosure.

For ease of explanation, referring to FIG. 17 together with FIG. 16, the user device 1600 may set the maximum time interval through the user interface at step S1700. The maximum time interval may be pre-set to an application.

The user device 1600 may request registration by requesting the resource information to the proxy 1610 and transmitting the maximum time interval information at step S1710. The device ID of the user device 1600 may be transmitted together during the above process.

Based on a failure response to the registration request received from the proxy 1610, the user device 1600 may request registration again at step S1720.

After retry, if the registration is successful, the user device 1600 may receive the resource information provided by the proxy 1610, and renew the pre-stored resource information at step S1730.

FIG. 18 is a flowchart illustrating a driving process of proxy according to a first embodiment of the present disclosure.

For ease of explanation, referring to FIG. 18 together with FIG. 16, the proxy 1610 according to an embodiment of the present disclosure, may receive a registration request from the user device 1600 at step S1800. The registration request may be a request for the resource information on thing in the Internet of things environment, and upon the registration request, the user device 1600 may transmit the maximum time interval information related to the time interval for repeatedly resource information. The user device 1600 may transmit the maximum time interval information together with the device information.

The proxy 1610 may determine whether the registration is normally performed according to the received registration request at step S1810.

If normally registered, OK response may be transmitted, and if not normally registered, the failure response may be transmitted to the user device 1600 at steps S1820 and S1830.

When the message scheduling starts to perform, and the schedule time for the user device 1600 arrives, the resource information may be transmitted to the user device 1600 at steps S1850 and S1860. The proxy 1610 may reduce the traffic of the thing, that is, the number of messages processed per hour within the allowable tolerance ratio as described above.

FIG. 19 is a flowchart illustrating a driving process of proxy according to a second embodiment of the present disclosure.

For ease of explanation, referring to FIG. 19 and FIG. 16, the proxy 1610 according to an embodiment of the present disclosure, may receive first time interval information indicating an allowable range for repeatedly receiving resource information of the thing, that is, the electronic apparatus, from a first user device at step S1900.

The proxy 1610 may repeatedly provide the resource information to the first user device at the time interval based on the received first time interval information.

When second time interval information is provided for receiving the same resource information as the first user device, the proxy 1610 may change the time interval based on the received second time interval information and provide the resource information to the second user device at step S1910. The time interval may be changed within the allowable tolerance ratio.

When the second user device requests for registration, the proxy 1610 may compare the second time interval information provided upon request with the pre-received first time interval information, and determine whether the time intervals coincide with each other, or which correlation they are in.

If the time intervals coincide with each other, or there is no correlation between the time intervals, the second time interval may be set to a message transmission time. However, if the time intervals coincide with each other, or there is correlation, the proxy 1610 may change the requested time interval within an allowable range, and provide the resource information. If coincided, the resource information may be transmitted at a time interval coinciding with the first time interval.

If a message is transmitted to each user device at different times, the different user devices may receive a message at the same time interval, and the traffic of the limited thing may be reduced since the number of messages of the resource information received from the thing is reduced. As a result, the battery use time may increase and the response delay caused by the bottleneck phenomenon may be reduced.

FIG. 20 is a flowchart illustrating a driving process of proxy according to a third embodiment of the present disclosure.

For ease of explanation, referring to FIGS. 16 and 20, the proxy 1610 according to an embodiment of the present disclosure may receive a first request signal including a first time interval allowed for repeatedly receiving resource information of the thing, that is, the electronic apparatus from the first user device at step S2000. The first request signal may be a signal for registration request, and include time interval, resource identification and user ID information.

The proxy 1610 may repeatedly provide the resource information to the first user device at the received first time interval at step S2010.

When the second request signal is received from the second user device, the proxy 1610 may determine a time for transmitting initial resource information by performing a scheduling operation, and it can be determined whether the time is the same as the first time interval or in a least common multiple relationship or a greatest common factor relationship. Based on the determination result, the resource information may be provided to the second user device. The second request signal may include time interval, resource identification, and user ID information.

In addition, when the first time interval arrives, the proxy 1610 may determine whether the time shift at the second time interval is possible for transmitting the resource information to the second user device, and when the time shift rate is within the allowable range, the resource information may be transmitted at a time determined as the first time interval. The details have been described well enough, so repetition of description will be omitted.

While the present disclosure has been described that all elements of an embodiment are coupled to one another or operate in combination, it is to be understood that the present disclosure is not limited to the disclosed embodiments. That is, within the scope of the present disclosure, all of the elements may be selectively coupled to one another in one or more of combinations. In addition, although all of the elements may be implemented as one independent hardware, some or all of the elements may be selectively combined to embody as a computer program including a program module performing a part or all of the functions in one or a plurality of hardware. The codes and code segments that constitute a computer program may be easily deduced by those skilled in the art. Such a computer program may be stored in a non-transitory computer readable medium readable by a computer, readable and executed by a computer, thereby realizing an embodiment of the present disclosure.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. A resource information providing method of a resource information providing apparatus, the method comprising:

receiving a first request signal including a first time interval allowed for repeatedly receiving resource information of an electronic apparatus from a first user device;

receiving a second request signal including a second time interval allowed for repeatedly receiving the resource information; and providing the resource information to at least one of the first user device and a second user device at a time determined based on the first time interval and the second time interval, wherein the resource information providing apparatus is a relay apparatus positioned on a communication path between the electronic apparatus and at least one of the first user device and the second user device.

2. The method as claimed in claim 1, wherein the first time interval and the second time interval are set to a default of an application included in the first user device and the second user device, or set by a user on a UI screen displayed on a screen.

3. The method as claimed in claim 1, wherein the providing of the resource information comprises:

determining whether the resource information is transmittable to the second user device at the first time interval by changing the second time interval; and as a result of determination, based on the resource information being transmittable, transmitting the resource information to the second user device.

4. The method as claimed in claim 3, wherein the determining comprises determining whether the first time interval and the second time interval coincide with each other or are in a least common multiple relationship or a greatest common factor relationship, or based on a current time (a base time) of the first time interval to arrive, whether a tolerance ratio of the second time interval is within a predetermined allowable range.

5. The method as claimed in claim 4, wherein the tolerance ratio of the second time interval is determined based on equation:

$$USER_{ToleranceRatio} = \frac{(USER_{ScheduleTime} - \text{Base Time})}{USER_{Max-Interval}} \times 100,$$

where $USER_{ScheduleTime}$ is obtained by combining a previous schedule time when a message is transmitted with the second time interval, $USER_{ToleranceRatio}$ is the tolerance ratio of the second time interval, and $USER_{Max\text{-}Interval}$ is maximum interval.

6. A resource information providing apparatus, comprising:
- a communication interface unit configured to:
  - receive a first request signal including a first time interval allowed for repeatedly receiving resource information of an electronic apparatus from a first user device, and
  - receive a second request signal including a second time interval allowed for repeatedly receiving the resource information; and
- a processor configured to:
  - control the communication interface unit to repeatedly provide the resource information to the first user device at the received first time interval, and
  - control the communication interface unit to provide the resource information to at least one of the first user device and a second user device at a time determined based on the first time interval and the second time interval,
- wherein the resource information providing apparatus is a relay apparatus positioned on a communication path between the electronic apparatus and at least one of the first user device and the second user device.

7. The apparatus as claimed in claim 6, wherein the first time interval and the second time interval are set to a default of an application included in the first user device and the second user device, or set by a user on a UI screen displayed on a screen.

8. The apparatus as claimed in claim 7, wherein the resource information providing comprises a server, a proxy device connected to the server, a gateway, or a hub.

9. The apparatus as claimed in claim 6, wherein the processor is further configured to: determine whether the resource information is transmittable to the second user device at the first time interval by changing the second time interval, and
- as a result of determination, based on the resource information being transmittable, control the communication interface unit to transmit the resource information to the second user device.

10. The apparatus as claimed in claim 9, wherein the processor is further configured to determine whether the first time interval and the second time interval coincide with each other or are in a least common multiple relationship or a greatest common factor relationship, or based on a current time (a base time) of the first time interval to arrive, whether a tolerance ratio of the second time interval is within a predetermined allowable range to determine whether the resource information is transmittable.

11. The apparatus as claimed in claim 10, wherein the processor is further configured to determine the tolerance ratio of the second time interval is based on equation:

$$USER_{ToleranceRatio} = \frac{(USER_{ScheduleTime} - \text{Base Time})}{USER_{Max\text{-}Interval}} \times 100,$$

where $USER_{ScheduleTime}$ is obtained by combining a previous schedule time when a message is transmitted with the second time interval, $USER_{ToleranceRatio}$ is the tolerance ratio of the second time interval, and $USER_{Max\text{-}Interval}$ is maximum interval.

12. A non-transitory computer readable recording medium that stores a program for executing a resource information providing method, wherein the resource information providing method comprises:
- receiving, at a resource information providing apparatus, a first request signal including a first time interval allowed for repeatedly receiving resource information of an electronic apparatus from a first user device;
- providing, at the resource information providing apparatus, the resource information to the first user device at the received first time interval repeatedly;
- receiving a second request signal including a second time interval allowed for repeatedly receiving the resource information; and
- providing the resource information to at least one of the first user device and a second user device at a time determined based on the first time interval and the second time interval,
- wherein the resource information providing apparatus is a relay apparatus positioned on a communication path between the electronic apparatus and at least one of the first user device and the second user device.

* * * * *